Jan. 30, 1945.     R. BARKER     2,368,440
ELECTRIC TOASTER
Filed Feb. 4, 1942
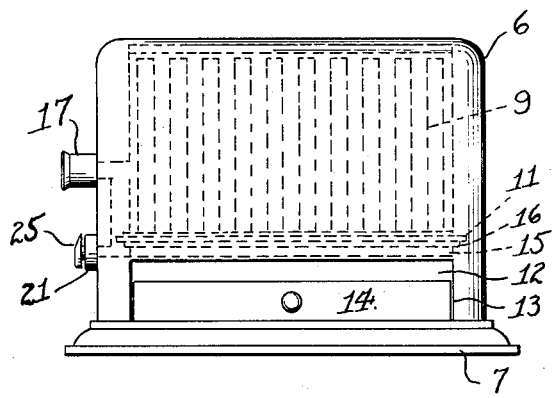
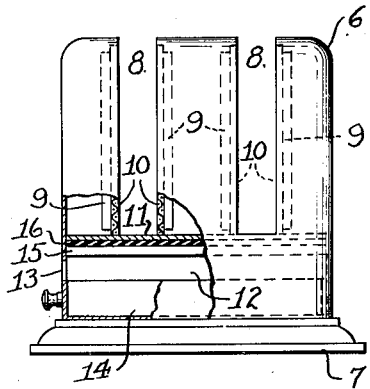
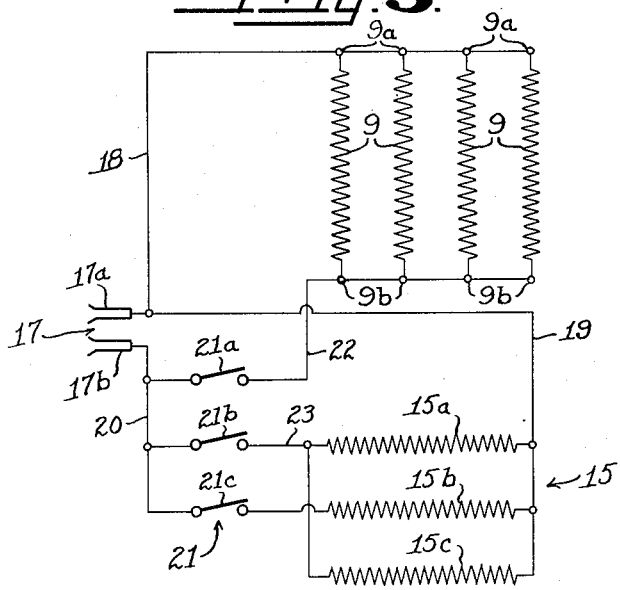
INVENTOR,
Ralph Barker
BY
Booth & Booth
ATTORNEYS Patented Jan. 30, 1945

2,368,440

UNITED STATES PATENT OFFICE 2,368,440

ELECTRIC TOASTER

Ralph Barker, San Francisco, Calif.

Application February 4, 1942, Serial No. 429,524

1 Claim. (Cl. 99—339)

The present invention relates to an electric appliance for toasting slices of bread and the like.

The principal object of the invention is to provide a toaster with which is combined means for keeping the toast warm after it is made. A secondary object is to so construct the warming element as to make it usable when desired for additional toasting or broiling. Other objects are to provide an appliance that is quick and convenient to use, economical in its use of electric power, simple in construction, easy to keep clean, and which toasts or cooks evenly the entire surface of the bread or other food product. Still further objects and advantages of the invention will become apparent from the following description, which should be read with the understanding that changes, within the scope of the claims hereto appended, may be made in the form, construction and arrangement of the several parts, without departing from the spirit of the invention as defined in said claims.

The invention may be embodied in an appliance of any desired size, either a large commercial unit for restaurant use or a small unit for home use on the breakfast table. For purposes of illustration, a small table unit is shown in the accompanying drawing, wherein:

Fig. 1 is a front elevation.

Fig. 2 is an end elevation, partly in section.

Fig. 3 is a diagram of the electrical heating elements and their circuits.

In the drawing, the reference numeral 6 designates an enclosing shell, which also acts as a supporting frame, having a base 7. The shell is provided in its upper portion with one or more vertical slots 8, two being shown, for the reception of slices of bread in vertical position. Electric toasting elements 9 are mounted vertically within the shell on each side of each slot 8, so that both sides of each slice of bread are toasted simultaneously. The toasting elements 9 may be of any usual construction, and are mounted on insulating supports in any usual manner, not shown.

Vertical screens 10 are secured to the shell on each side of each slot. These screens are preferably in the form of grids, with large or open mesh in order not to interfere unduly with the passage of radiant heat from the toasting elements 9 to the slices of bread. Their purpose is to guide and support the sides of the slices and prevent them from coming too close to the toasting elements, thereby insuring even toasting. A horizontal partition 11 is mounted in the shell beneath the slots 8 and toasting elements 9. This partition may be either a solid plate, as shown, or a fine mesh screen. Its purpose is to support the lower edges of the slices, and to prevent crumbs from dropping through to the space beneath.

The lower portion of the shell, beneath the partition 11, contains a chamber 12 having an elongated horizontal opening 13 through at least one side of the shell. A removable horizontal tray 14 rests upon the bottom of said chamber, and may be removed and inserted through the opening 13. The chamber and the tray are approximately the full size of the shell.

A horizontal electric heating element 15 is mounted on suitable insulating supports (not shown) near the top of the chamber 12. A layer of heat insulating material 16 is preferably positioned between said horizontal heating element and the partition 11, thereby forming a baffle to separate the slots 8 from the chamber 12 and to prevent burning the lower edges of the slices of bread in said slots. The heating effect of the horizontal element 15 is preferably controllable, so that it can be used either for warming or keeping warm slices of toast placed in the tray 14, or for broiling or toasting bread, sandwiches and the like upon said tray. The horizontal heating element is preferably controlled separately from the vertical toasting elements 9.

Control of the elements 9 and 15 may be accomplished in any suitable manner, but as an example of one method thereof, I have shown in Fig. 3 a diagram of the electrical connections. Electric current is supplied through the usual plug socket 17, one contact 17a of which is connected by a wire 18 with one terminal 9a of each vertical element 9, and by a wire 19 with one terminal of each section of the horizontal element 15, the latter being made up of several separately controlled coils or sections conventionally indicated at 15a, 15b, and 15c. The other terminal 17b of the plug socket 17 is connected by a wire 20 with the common terminal of a three pole switch 21 indicated as having three pairs of contacts 21a, 21b, and 21c. The contacts 21a are connected by a wire 22 with the other terminal 9b of each of the vertical elements 9, the contacts 21b are connected by a wire 23 with the other terminal of each of the sections 15a and 15c of the horizontal element 15, and the contacts 21c are connected by a wire 24 with the other terminal of the section 15b of said horizontal element. Thus the vertical toasting elements are controlled (on or off) by the switch contacts 21a independently of the horizontal heating element. The latter can be separately and selectively controlled to provide three degrees of heat by closing one or the other or both of the switch contacts 21b and 21c. The contacts 21a, 21b and 21c can be incorporated in any suitable and well known form of switch having a single selective control knob 25, as indicated in Fig. 1.

It will be seen from the foregoing that either the vertical toasting elements 9 or the horizontal element 15 may be used separately, or both may be used together. Thus toast may be made in the upper portion of the appliance without using the lower portion, or if it is desired to keep the toast warm, the horizontal element 15 may be set at low heat, and the toast, after being made in the upper portion, may be transferred to the tray 14 and kept warm in the lower chamber 12. If it is desired to make certain forms of sandwiches and the like that require toasting or broiling on one side only, the horizontal element can be set at medium or high heat, and such products cooked in the lower compartment, either without using the upper portion or while ordinary toast is being made therein.

I claim:

An electric toaster comprising a base, vertical side walls rising from said base, a horizontal top, said walls and top defining a rectangular shell, one of said side walls having a horizontally elongated aperture in its lower portion, two opposite side walls and said top being formed with spaced parallel vertical slots, each slot being proportioned as to width and depth to receive and envelope a slice of bread positioned on edge to be toasted, a horizontal heat insulating partition within said shell beneath said slots, electric heating elements positioned vertically within said shell, one of said heating elements being positioned on each side of each slot for the purpose of toasting the slices of bread therewithin, another heating element positioned horizontally in said shell immediately below said heat resisting partition, and a horizontal tray in said shell below said horizontal heating element, said tray being removable through the first mentioned side wall aperture.

RALPH BARKER.